UNITED STATES PATENT OFFICE.

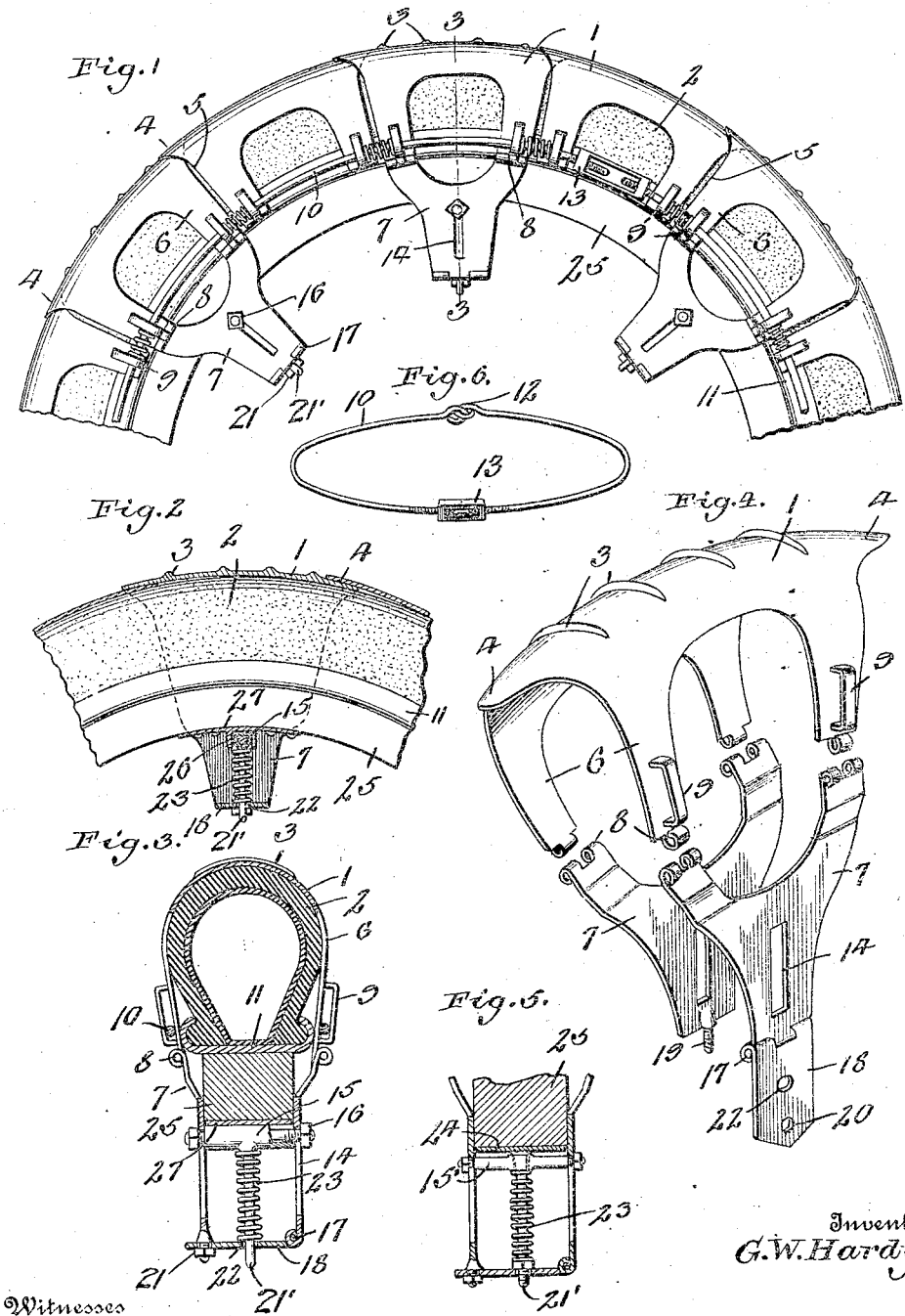

GEORGE W. HARDY, OF BALTIMORE, MARYLAND.

TIRE-ARMOR.

1,138,559.     Specification of Letters Patent.    Patented May 4, 1915.

Application filed February 4, 1914. Serial No. 816,413.

*To all whom it may concern:*

Be it known that I, GEORGE W. HARDY, a citizen of the United States, residing at Baltimore, in the State of Maryland, have invented new and useful Improvements in Tire-Armors, of which the following is a specification.

This invention relates to tire armors, the object of the invention being to provide a readily attachable and detachable armor for pneumatic tires and the like which will provide a metallic wearing surface and thereby protect the tire itself from excessive wear and at the same time increase the traction of the wheel to which the improved armor is applied.

With the above and other objects in view, the invention consists in the novel construction, combination and arrangement of parts, as will hereinafter be more fully described, illustrated and claimed.

In the accompanying drawings:—Figure 1 is a side elevation of a section of a wheel felly and tire, showing a section of the improved armor applied thereto. Fig. 2 is a vertical longitudinal section through a portion of the armor showing the felly and tire in elevation. Fig. 3 is a cross section taken approximately on the line 3—3 of Fig. 1 with parts in elevation and other parts broken away. Fig. 4 is a detail perspective view on an enlarged scale of one of the armor sections together with the jointed arms thereof. Fig. 5 is a detail section on the same line as Fig. 3 showing a modified arrangement of stem and crosshead. Fig. 6 is a detail perspective view of one of the retaining rings.

The complete armor contemplated in this invention is made up of an endless circular series of sections, each section, as shown in Fig. 4, comprising an arched main body 1 adapted to fit over the tread surface of the tire indicated at 2 so as to protect the tread surface thereof. The main body portion of the armor section shown in Fig. 4 is preferably provided on its wearing surface with transversely extending traction ribs 3 to obtain a better hold on the road surface and the end portions 4 of the body are preferably extended as shown so that when the sections are assembled they will bear an overlapping relation to each other along the tread while leaving sufficient spaces at 5 between the side wall portions of the sections to allow for the necessary inward, outward and rocking movements of the sections.

In the preferred embodiment of the invention, each alternate section 1 is provided adjacent to the opposite ends thereof with oppositely located arms 6 to which extension arms 7 are jointed, preferably by hinge joints as indicated at 8 thus enabling the extension arms 7 to swing to facilitate the operation of placing the armor as a whole on the tire and rim and removing the same therefrom.

Each of the arms 6 is provided on its outer side with a loop 9 the length of which is approximately radial to the center of the wheel and passing through all of the loops 9 of the entire series of sections 1 are endless retaining rings 10, two of such rings being employed as shown in Fig. 3 and arranged at opposite sides of the wheel rim 11. Each of said rings is preferably made as shown in Fig. 6, that is to say it is provided with a joint 12 at one side, and provided at a diametrically opposite point with a turn buckle 13 so that the ends of the ring adjacent to the turn buckle 13 may be separated from each other to insert and remove the ring relatively to the loops 9 and for the purpose of taking up slack in the ring 10 to securely hold all of the sections in place on the tire.

The extension arms 7 are provided with longitudinal slots 14 which extend radially with respect to the center of the wheel, said slots being adapted to receive the opposite extremities of a sliding crosshead 15 which is movable lengthwise of the slots 14 and held in place by nuts 16 or the equivalent thereof, said nuts being arranged on the outside of the extension arms 7. The nuts 16 may be tightened for the purpose of holding the extremities of the cross heads in fixed relation to the extension arms 18 to facilitate the application and removal of the sections of the protector or armor.

Hingedly connected at 17 to the extremity of one of the extension arms 7 is a hasp 18 while the extremity of the other extension arm 7 is provided with a stud bolt 19 which is adapted to pass through a hole 20 in the hasp and receive a nut 21. Under the arrangement shown in Fig. 3, the cross head 15 has extending inwardly from the center thereof a stem 21′ which passes through a hole 22 in the center of the hasp 18 and is surrounded by a coiled expansion spring 23 which is sustained at one end by the hasp 18 and which bears at its opposite end against the cross head 15. This permits the stem 21′ to slide through the hole 22 in the hasp 18 in order to accommodate the expansion and contraction of that portion of the tire which rests against the ground.

Instead of forming the stem 21′ directly on the crosshead 15, the crosshead indicated at 15′ in Fig. 5 may be made to slide on the stem 21ᵃ which in this case is shown as formed integrally with a base plate 24 secured to the wheel felly indicated at 25. In such latter case the sliding crosshead 15′ is adapted to slide upon and lengthwise of the stem 21ᵃ as the spring 23′ is compressed and allowed to expand. The same result takes place under both of the arrangements shown in Figs. 3 and 5.

Under the arrangement shown in Fig. 3, the crosshead 15 when lying close to the wheel felly 25 rests between the parallel guide flanges 26 formed on a base plate 27 fastened to the inner face of the felly 25, the flanges 26 serving to steady the sliding movement of the crosshead.

In order to equalize the distance between the sections of the armor, coiled expansion springs 28 are placed around the retaining rings 10 so as to exert a pressure in opposite directions against the loops 9 of adjacent sections as clearly shown in Fig. 1.

While all of the sections of the armor may be provided with the extension arms 7, it is preferred to omit the said extension arms 7 from some of the sections as shown in Fig. 1 so that there will not be so many hasps 18 to manipulate while placing the armor on the tire and removing the same therefrom.

It will, of course, be understood that any desired number of sections 1 may be employed and the dimensions thereof may be varied to suit the particular tire and wheel upon which the completed armor is placed. These and other changes in the form, proportion and minor details of construction may be resorted to without departing from the principle or sacrificing any of the advantages of the invention.

What I claim is:—

In tire armor, a transversely arched tread-covering section, integral arms at opposite sides of said section, extension arms having a jointed connection with the first named arms, extending toward the center of the wheel and formed with longitudinal slots, a hasp hinged to the inner extremity of one of said arms, means for fastening said hasp to the extremity of the other arm, and cushioning means supported by said hasp, adapted to bear against a wheel felly and guided by said slots, said cushioning means embodying a cross head having its extremities slidable in said slots, a radially extending guide stem, an expansion spring encircling said stem and interposed between said cross head and hasp, and means for clamping the ends of said cross head temporarily in fixed relation to said extension arms.

In testimony whereof I affix my signature in presence of two witnesses.

GEORGE W. HARDY.

Witnesses:
 GEORGE HEDLY,
 GEO. W. PRESTON.

Copies of this patent may be obtained for five cents each, by addressing the "Commissioner of Patents, Washington, D. C."